United States Patent [19]

Bugler, III et al.

[11] Patent Number: 5,147,583

[45] Date of Patent: Sep. 15, 1992

[54] NON-CLOGGING FILM FILL ASSEMBLY FOR COUNTERFLOW WATER COOLING TOWER

[75] Inventors: Thomas W. Bugler, III, Prairie Village; Ohler L. Kinney, Jr., Leawood, both of Kans.

[73] Assignee: The Marley Cooling Tower Company, Mission, Kans.

[21] Appl. No.: 786,376

[22] Filed: Nov. 1, 1991

Related U.S. Application Data

[63] Continuation-in-part of Ser. No. 631,378, Dec. 20, 1990, abandoned.

[51] Int. Cl.⁵ .............................................. B01F 3/04
[52] U.S. Cl. .................................................. 261/112.2
[58] Field of Search ...................................... 261/112.2

[56] References Cited

U.S. PATENT DOCUMENTS

| | | | |
|---|---|---|---|
| 3,374,992 | 3/1968 | Greer | 261/112.2 |
| 3,374,994 | 3/1968 | Greer | 261/112.2 |
| 3,500,615 | 3/1970 | Meek | 261/112.2 |
| 3,952,077 | 4/1976 | Wigley | 261/112.2 |
| 4,344,899 | 8/1982 | Monjoie | 261/112.2 |
| 4,427,607 | 1/1984 | Korsell | 261/112.2 |
| 4,499,031 | 2/1985 | Sexton et al. | 261/112.2 |
| 4,512,938 | 4/1985 | Jones et al. | 261/112.2 |
| 4,670,197 | 6/1987 | Stackhouse | 261/112.2 |
| 4,905,313 | 2/1990 | Stackhouse | 261/112.2 |
| 5,013,492 | 5/1991 | Gay et al. | 261/112.2 |

FOREIGN PATENT DOCUMENTS

| | | | |
|---|---|---|---|
| 678100 | 7/1939 | Fed. Rep. of Germany | 261/112.2 |
| 54-38985 | 11/1979 | Japan | 261/112.2 |

*Primary Examiner*—Tim Miles
*Attorney, Agent, or Firm*—Hovey, Williams, Timmons & Collins

[57] ABSTRACT

A fill pack for counterflow water cooling towers is disclosed which is provided a series of generally parallel upright film fill sheet sections wherein each of the sheet sections has wall structure configured such that adjacent sheet sections define therebetween a series of elongated, side-by-side, vertical, longitudinally non-linear passages for receipt of hot water which flows in counter-current heat exchange relationship with upflowing coolant air. Each of the passages is defined fully formed tube sections having an open area throughout their length of dimensions such that there is no tendency for the passages to become clogged by extraneous objects in the water or microorganism growth on the wall structure defining the passages. Transition zones between horizontally offset vertical segments of the passages provide for smooth and uniform film flow of water from one passage segment to the offset passage segments therebelow. Projections-depressions in the surfaces of the passage defining wall structures of the sheets prevent channeling of the water and impart turbulence to the coolant air.

22 Claims, 6 Drawing Sheets

NON-CLOGGING FILM FILL ASSEMBLY FOR COUNTERFLOW WATER COOLING TOWER

This application is a continuation-in-part of Ser. No. 07/631,378, filed Dec. 20, 1990 of the same title, now abandoned.

BACKGROUND OF THE INVENTION

1. Field of the Invention

This invention relates to industrial water cooling towers and especially an improved non-clogging film fill assembly for counterflow type towers of the type which must use water that has not been adequately treated to preclude microorganism growth or routinely filtered as may be necessary to remove foreign objects.

2. Description of the Prior Art

Industrial water cooling towers have long been used to reject heat in power generation, to provide cooling water for petrochemical processes, and serve as a means to lower the temperature of various chemical process streams and equipment. In the case of power generation plants, the cooling tower requirements are relatively large and it has been the practice in recent years to fabricate increasingly larger cooling towers. Counterflow towers have been found to be especially useful in these instances because of the efficiency of the towers and the compact nature of the structure. Cooling air may be brought into heat exchange relationship with the hot water either by way of convection through use of a natural draft stack, or by means of one or more large diameter, power-driven fans.

In order to further increase the efficiency of cooling towers for industrial applications which require the use of very large towers, efforts have been made to increase the effectiveness of heat exchange between the hot water and the cooling air. The degree of direct contact of the water to be cooled with the coolant air has a significant bearing on the efficiency of the cooling process. Counterflow towers, wherein the hot water and air are brought into countercurrent flow relationship have long been known to be efficient heat transfer units. Initial egg crate or slat splash bar towers were ultimately supplanted by film fill towers because of the greater heat transfer properties of a water film as compared with the multiplicity of droplets of water which are produced by splash fills. Furthermore, film fills are significantly shorter than splash fills thus decreasing the head on the pump delivering hot water to the tower and making operating less expensive because of the lower horsepower pump requirements.

The superior heat transfer characteristics of counterflow towers as well as improved efficiency based on lower pump heads has accelerated their use in recent years. Cooling tower designers in seeking to increase the efficiency of counterflow towers have also sought to further decrease the overall height of such towers by making the fill more effective than has been the case in the past. With the advent of synthetic resin sheets which are capable of withstanding higher temperatures without significant deformation than was previously the case, along with the development of resin formulations which are more resistant to deterioration under constant wet conditions, fill assemblies made up of sheets of the plastic for film flow of water thereover have in many instances completely supplanted prior fill structures which primarily relied upon break-up of the water for surface increase purposes instead of thin films of water over a large multiplicity of closely spaced sheets of plastic.

Although film fills have found acceptance in many applications including large industrial cooling towers for power generating plants and the like, problems have arisen by virtue of the fact that governmental regulatory agencies have imposed stricter limitations on the addition of agents to the cooling water which suppress growth of microorganisms and the like. For example, it has long been the practice to add chlorine or chlorine containing compounds to the cooling water in order to prevent microorganism growth. However, it is now known that when chlorine in high concentrations is discharged into streams or other natural bodies of water, the chlorine can produce adverse consequences which are harmful to biological life in the stream and in general increase what some deem to be undesirable pollution of the flowing water. There is some evidence that high chlorine levels in streams can actually produce dioxin-like compounds.

Cooling tower operators have routinely removed a portion of the cooling tower water in the form of blow down and returned it to the source such as a stream to prevent buildup of chemical additives in the water. As much as 10% of the water may be continuously returned to the stream or other water source as blow down. This water can contain a relatively high concentration of the additive and therefore significant amounts of chlorine, for example, may be present at the outlet of the cooling tower which discharges into the adjacent stream, lagoon, or lake water source. Concern over stream and water body pollution has led governmental authorities to restrict the use of additives such as chlorine in cooling tower water for preventing growth of microorganisms in the recirculating cooling water. In fact, absent a more acceptable anti-microbial additive than chlorine and which is available at a reasonable cost, many tower operators have elected to simply eliminate or drastically reduce the additives such as chlorine in the cooling tower water.

The result in certain instances has been catastrophic build up of microorganism growth in the flow assembly of counterflow industrial water cooling towers. One highly effective and efficient fill assembly for counterflow towers employs corrugated plastic sheets which are positioned so that adjacent corrugations cross one another at approximately a 30° angle. The peaks of the corrugations therefore contact one another where the peaks cross. In a cross-corrugated fill utilizing plastic corrugated sheets which are spaced a distance such that the greatest spacing therebetween is of the order of ⅜ inch, there can be as many as 646 contact points or nodes per cubic foot of the fill assembly. These nodes serve as habitats for microorganisms which proliferate around the contact point. As the water to be cooled flows downwardly through the corrugated fill structure, microorganisms present in the water and whose growth is no longer inhibited by suitable anti-microbial compounds in the water, collect at the points of intersection of the corrugations of the fill. The microorganisms then start to multiply at the nodal points in the fill assembly. This growth can continue until complete blockage of the water flow paths through the fill unit occurs.

In like manner, unless the cooling tower water is continuously filtered, suspended solids in the make-up water from the stream or other natural water source can collect and accumulate in the water. These solids are trapped by the microorganism growths in the fill assembly and increase blockage of the water flow paths. In addition, airborne solids can build up in the water during tower operation unless the water is filtered.

The significance of the problem is apparent when it is recognized that in the case of a 500 megawatt power plant, if the plant must be shut down because of blockage of the fill assembly of the cooling tower serving such plant, the loss of revenue to the utility is many thousands of dollars per day. Replacement of the fill can take from one to two months. Thus, lost revenues readily mount to eight figure numbers.

The enormity of the problem is further demonstrated by the fact that cooling towers of the type discussed and especially those used for high-megawatt plants such a nuclear facilities, have fill assemblies whose plan area can be anywhere from one to two acres.

Another factor involves the insidious nature of the problem. Microorganism and solid object blockage of the cooling tower fill necessarily occurs in a gradual form. Thus, the performance of the tower will gradually decrease which has an adverse economic impact on cooling of the steam used in the plant and decreasing the efficiency of the generation process. This produces a slow loss in output which translates directly into decreased income to the utility. The tendency is to defer replacement of the fill for as long as possible because of the cost of tearing out the old fill and replacing it with a new assembly.

SUMMARY OF THE INVENTION

The present invention provides a non-clogging fill assembly especially useful in industrial size water cooling towers of the counterflow type which are operating with either little or no chemical additives in the water to limit microorganism growth, or that routinely filter the water to remove solid materials.

The anti-clogging characteristics of the improved fill assembly are attributable to the provision of unique film fill sheets adapted to be placed in parallel side-by-side relationship and configured such that the wall structure thereof defines a series of upright, common non-linear passages for receipt of hot water and cooling air flowing in countercurrent relationship, with each of the passages having an open area throughout the length thereof sufficient to impede clogging of the passages by extraneous objects in the water or microorganism growths on the wall structure.

In particular, the fill sheets each have wall structure made up of a series of horizontally extending, vertically spaced regions which define an undulating pattern so that when a plurality of sheets are placed in side-by-side relationship, the undulations of adjacent sheets presenting successive peaks and valleys cooperate to define the upright passages for countercurrent flow of hot water and air respectively. In view of the fact that the undulating pattern of vertically adjacent regions of each sheet are vertically offset with respect to one another, the vertical passages defined thereby have offset segments which prevent the hot water from simply rushing downwardly through the fill assembly without adequate interchange with the cooling air flowing upwardly therepass.

An important feature of the invention is the fact that each of the fill sheets has novel transition zones between vertically adjacent undulations which function to smoothly and uniformly direct water flowing downwardly through one passage segment into a passage segment therebelow which is horizontally offset from a passage segment above. These transition zones are configured to direct water from each overlying passage segment into a pair of passage segments below so that the water is in effect redivided and recombined a number of times throughout the height of the fill pack. Similarly, the airflow is divided and recombined a number of times as it flows upwardly through the serpentine passages. This has the effect of promoting contact of the coolest air with the hottest water at all times.

An especially important feature of the instant invention is that the improved non-clogging film fill design hereof has significantly less nodes or points where microorganisms and/or suspended solids can be trapped, as compared with the nodes present in previously used cross-corrugated film fill packs. For example, if a ⅜" center-to-center fill sheet spacing is used in the present invention, only about 185 nodal points per cubic foot would be presented as opposed to as many as 646 nodal points of the cross-corrugated type of film fill. In the case of a ⅜" center-to-center fill sheet spacing, which is the preferred form of the present non-clogging fill construction, only about 165 nodal points or zones of contact are presented per cubic foot of fill.

The fill sheets are also provided with surface area increasing means which limits channeling of the hot water as it flows downwardly through a respective non-linear passage and which imparts turbulent flow characteristics to at least a part of the cooling air flowing upwardly through a corresponding passage, without interfering with the anti-clogging characteristics of such passages.

The surface area increasing means may take the form of a series of projections or depressions formed in the wall structure of each fill sheet and which extend across a respective passage to spread out water gravitating along the passage segment wall surface, and to divert at least a part of the upflowing airstream from its straight line flow path thus causing turbulent action. As a consequence, a greater temperature spread is maintained between the water and air throughout the upright height of the fill assembly.

If desired, hot water redistribution means may be provided at the top of the improved fill pack to assure that hot water directed onto the fill through distributors such as spray nozzles or the like will be relatively uniformly distributed over the fill. The hot water redistribution structure may comprise cross-corrugated sheets of the type previously used in the fill for counterflow type towers. The cross-corrugated region of each sheet is desirably integral with the upright passage defining regions of such sheets. However, the cross-corrugated region of the fill packs thereby presented are of relatively narrow height and there is little if any tendency for microorganisms to build up on the cross-corrugated section of the fill because the water distributed thereacross is flowing at such a rate at the upper part of the fill pack that growth buildup of microorganisms does not take place. However, below the cross-corrugated redistribution areas, the water slows down perceptibly and growth of microorganisms can occur if, as previously indicated, the entire fill was made up of cross-corrugated areas.

It has been determined that by uniquely forming the sheets in a predetermined, upright, non-linear passage-defining pattern, a fill assembly for counterflow towers may be provided at a cost no greater, or even somewhat less, than prior standard cross-corrugated fills by virtue of the fact that the same plastic sheet material may be used for the fill, the spacing of individual sheets can even be greater than in the case of cross-corrugated fill packs requiring the use of less fill sheets, all without significant sacrifice in the performance of the tower. Tests have shown that a fill pack utilizing the improved passage-defining sheets of the present invention as compared with previously used cross-corrugated fill assemblies perform similarly with the difference being no more than about 3%, or at the most about 5%. However, when it is appreciated that most cooling towers have a design performance factor of 102 to 103% to take into account operation for a limited time under the most extreme temperature and humidity conditions likely to be encountered in a particular geographical area, the performance differences, if any, between the present fill structure and previously used cross-corrugated fills is not of significant economic importance, relative to solving the problem of microorganism growth blockage.

Although vertical passage film fill sheets have previously been suggested, as for example in Hamon Sobelco, S.A., U.S. Pat. No. 4,344,899, the fill illustrated and described in this patent does not provide a series of upright passages having horizontally offset vertical segments where each passage has an open, cross-sectional area throughout its length sufficient to prevent buildup of microorganisms or accumulation of solid materials. In the '899 patent, the upright passages have a series of restricted or pinched down zones which would impede air flow and provide sites for material buildup blockage against flow of water.

DETAILED DESCRIPTION OF THE PREFERRED EMBODIMENT

Figure 1:
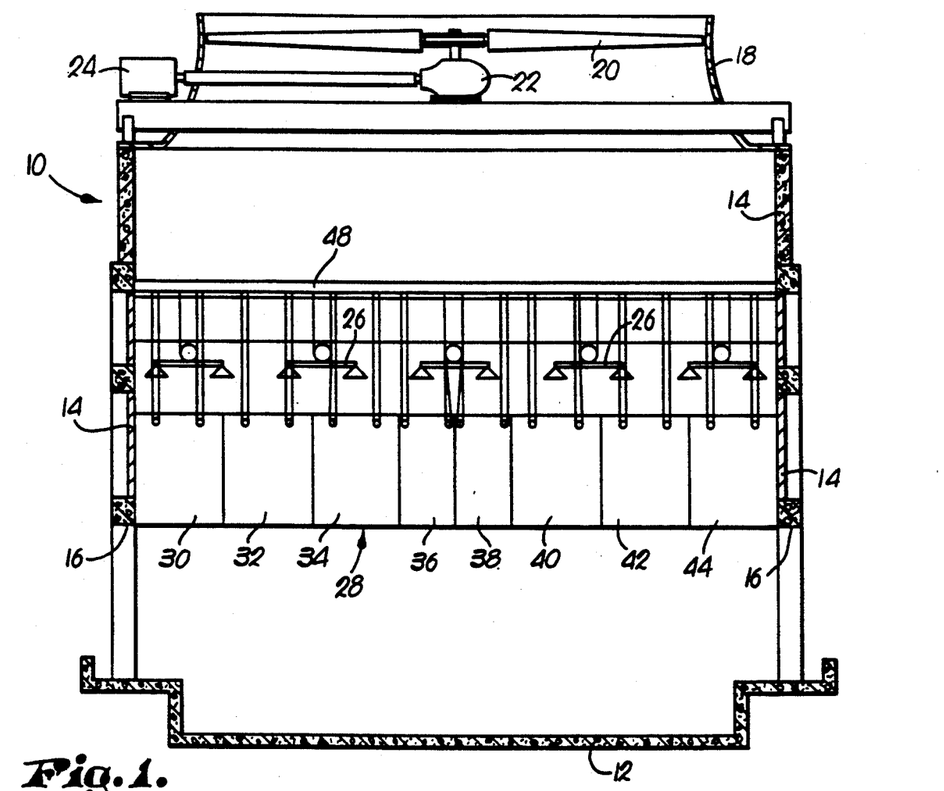
FIG. 1 is a diagrammatic, vertical, cross-sectional representation of one type of counterflow water cooling tower illustrating the underlying hot water basin, fill structure embodying the principles of the present invention, hot water distributors above the fill structure, and a mechanical draft fan for pulling cooling air in through the bottom of the tower and to cause such air to flow upwardly through the fill assembly and to be discharged vertically via the tower stack.

A typical mechanical draft counter-current industrial-type water cooling tower is shown diagrammatically in FIG. 1 and designated by the numeral 10. Towers of this type include a cold water basin 12 normally recessed in the ground, as well as casing structure 14 having air inlets 16 on at least two sides thereof immediately above basin 12. A fan stack 18 carried by the upper part of casing 14 discharges upwardly and receives a fan blade assembly 20 rotated by gear structure 22 driving by a remotely mounted motor 24.

A series of depending hot water distributors 26 in the form of spray nozzles or the like are located beneath the fan. The fill structure broadly designated by the numeral 28, directly underlies hot water distribution means 26 and completely fills the horizontal extent of casing 14 directly above air inlets 16. In the illustrative tower of FIG. 1, fill structure 28 is made up of a number of counterflow fill packs 30, 32, 34, 36, 38, 40, 42, and 44 respectively. Packs 30-34 and 40-44 are of essentially the same dimensions between opposed inlets 16, whereas the innermost packs 36 and 38 are of lesser width. It is to be understood in this respect, though, that the number of packs and the effective cubical dimensions thereof depends upon the particular installation and the size of the tower in which the packs are mounted.

Figure 2:
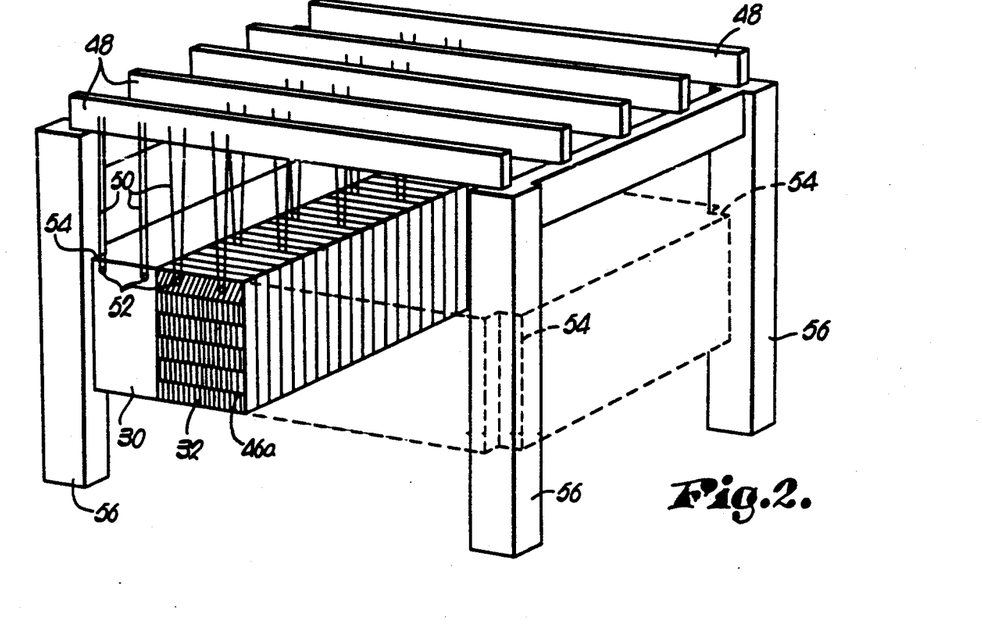
FIG. 2 is a fragmentary, isometric view of the improved fill structure and the means for supporting the same within a typical counterflow tower.

As is apparent from FIGS. 2 and 4, each of the fill packs 30-44 is made up of a series of upright, individual synthetic resin sheets 46 which are joined together in parallel, side-by-side relationship sheets 46 are preferably vacuum formed to present undulations and depressions and projections in the surface thereof, as will be hereinafter described in detail. Means for supporting the individual packs 30-44 in tower casing 14 beneath hot water distribution means 26 may take the form of a plurality of horizontally disposed and spaced crossmembers 48 located above the nozzles of hot water distributors 26 and carrying a series of wire supports 50 which are wrapped around elongated metal tubes 52 extending through the upper extremities of each of the fill packs 30-44. In the embodiment of the invention illustrated in FIGS. 1 and 2, two tubes 52 are provided for each pack 30-44. The tubes 52 extend through the uppermost part of respective fill packs from one end thereof to the opposite end of the same. Although two support tubes 52 for each pack are shown in the drawings, it is to be appreciated that additional tubes and corresponding wire supports therefore may be provided for each pack depending upon the overall cubical dimensions thereof.

For descriptive purposes, only one of the fill packs 30-44 will be described in detail, although it is to be understood that the sizes thereof may vary. Furthermore, as is evident from FIG. 2, the upright, outermost corners of the end fill packs 30 and 44 may be cut away, as at 54, to accommodate upright structural supports such as the upright members 56 shown in FIG. 2.

Referring to FIGS. 3 and 5-7, which, for example, illustrates pack 32, the pack is made up of a series of upright synthetic resin sheets 46 in side-by-side, parallel relationship. Each sheet 46 is made up of a vacuum formed synthetic resin panel that is desirably from 15 to 25 mm. in thickness. The preferred sheet thickness is 15 mils. As can be appreciated, the thinner the material the better from a cost standpoint. However, the synthetic resin panel must be of sufficient thickness that it will withstand elevated temperatures encountered within the tower without significant deformation during use of the fill pack. Fifteen mil. panels have generally been found to be adequate in this respect under most hot water conditions found in industrial water cooling tower applications.

Figure 3:
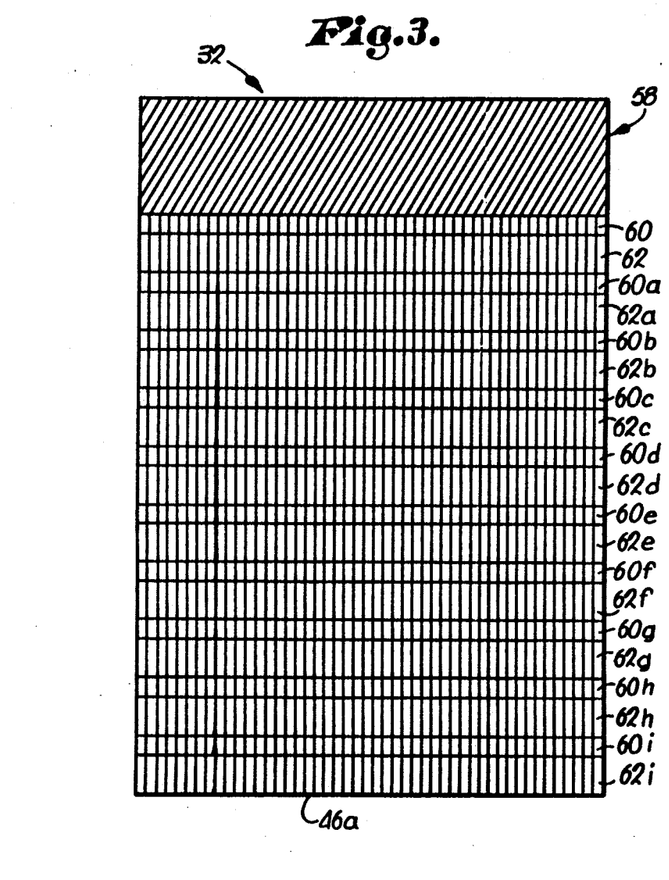
FIG. 3 is diagrammatic, side-elevational view of the fill pack illustrating the cross-corrugated upper hot water redistribution section thereof which is integral with the upright passage segment-defining regions of the fill pack underlying the redistribution section.

As shown in FIG. 3, the end sheet 46a depicted therein has an upper corrugated hot water redistribution section 58 which is integral with a transition zone 60 therebelow. A series of vertically spaced, horizontally extending undulating regions 62 and 62a-62i, separated by respective transition zones 60a-60i, are configured to define essentially vertical, non-linear water and air flow passages extending the full height of pack 32 below section 58 and made up of a series of horizontally offset vertical passage segments.

Figure 4:
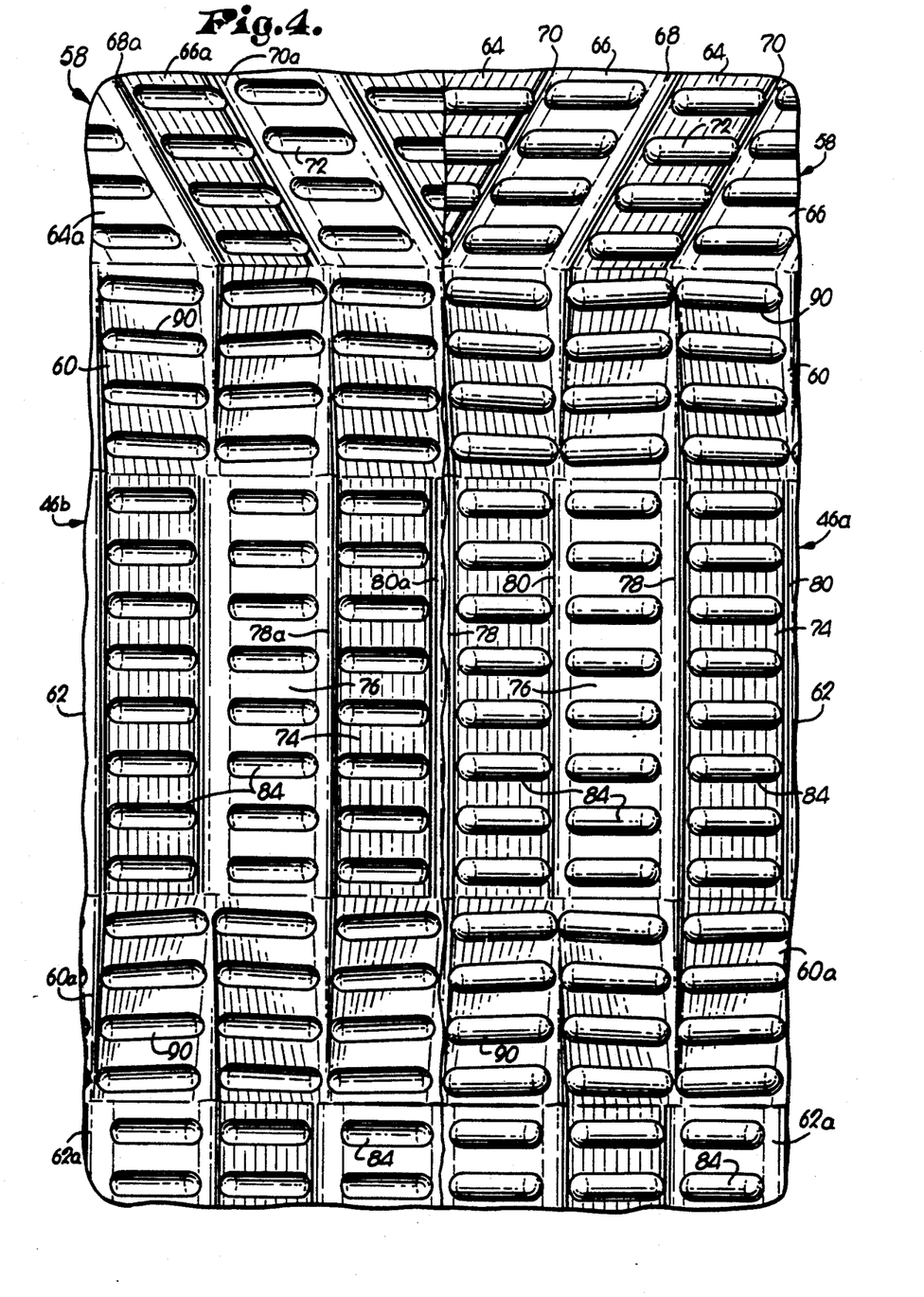
FIG. 4 is a fragmentary, elevational view of the fill pack illustrating a portion of one fill sheet section in the right part of the figure and showing a portion of the fill sheet section therebehind in the left portion of the figure.

Viewing FIG. 4, and referring to the redistribution section 58 thereof, the section has a series of corrugations which are at an angle of about 30° with respect to vertical. The corrugations are each essentially triangular in cross section and therefore have angular side walls 64 and 66 which converge to form an elongated, rectilinear crest 68. In like manner, the diverging portions of side walls 64 and 66 join together to form the bottom of elongated, rectilinear valley depressions 70. Each of the side walls has a series of elongated, transversely circular projections 72 which extend across the full extent of each of the walls 64 and 66. As is apparent from FIG. 4, although walls 64 and 66 are at an angle with respect to the vertical, projections 72 are oriented to be substantially horizontal in extent.

The sheet 46b immediately behind sheet 46a has a corrugated region 58 made up of angular side walls 64a and 66a which are at an angle of about 30° with respect to the vertical. Walls 64a and 66a converge to form crests 68a and valley depressions 70a, respectively, similar to crests 68 and valley depressions 70. However, as is apparent from FIG. 4, the corrugations of sheet 46a are at an angle with respect to the vertical in one direction, for example to the right, viewing that figure, whereas the immediately adjacent sheet 46b is formed so that the corrugations are to the left as shown in the figure. In this manner, the triangular corrugations cross one another with contact occurring between each part of the crests 68 or valley depressions 70 which intersect with an adjacent crest or depression. The overall height of cross-corrugated hot water redistribution section 58 of each of the fill packs 30-44 may vary, but preferably is within the range of 6 to 24 inches with a preferred height being 12 inches. In addition, the maximum spacing between any portions of adjacent fill sheets 46 as represented by sheets 46a and 46b of FIG. 4, is from about ⅛ inch to 2 inches, with better thermal results being when the spacing is about ⅜ to ⅞ inch, and with the preferred spacing being about ¾ inch. These dimensions are measured by determining the center-to-center distance of the furthest spaced portions of adjacent sheets, as for example, sheets 46a and 46b.

The included angle between walls 64 and 66 or 64a and 66a is preferably from about 80° to about 100°, with better results being obtained with an included angle of from about 85° to about 105°, with best thermal performance being obtain at an included angle of about 90°. Although the preferred crossing angle of the corrugations of section 58 is about 30° as described above, it is to be understood that such crossing angle may vary from about 20° to 40°, with a better range being from about 25° to about 35°. The cross corrugations in a preferred form have a vertical depth measured straight down of about 0.4608 inch. The transverse width of each of the angular side walls 64 and 66 is about 1.92 inches in the preferred construction, with the center-to-center distance between crest 68 being about 1.3 inches. The projections 72 are in effect similarly shaped depressions in the opposite side of the sheet by virtue of vacuum forming thereof. Thus, each depression is preferably about 0.070 inch deep and about 0.140 inch wide at the base of the depression, in that the formed depression-projection is produced by a mold cut with a 5/16 inch diameter ball mill. Each of the depressions-projections is about 1.15 inch in length, the opening of the depression thereof is about 0.2607 inch in width, and the radius of the circular cross-section is about 5/32 inch. As is apparent from FIG. 4, each of the projections-recesses 72 commences substantially at a crest 68 and extends almost to the bottom of a respective valley depression 70.

The transition zone 60 immediately below corrugated region 58 is of the same wall configuration as the transition zones 60a-60i inclusive and therefore is described hereinafter in specific detail with reference to the description of transition zone 60a.

Figures 5, 6, 7, 15, 16:
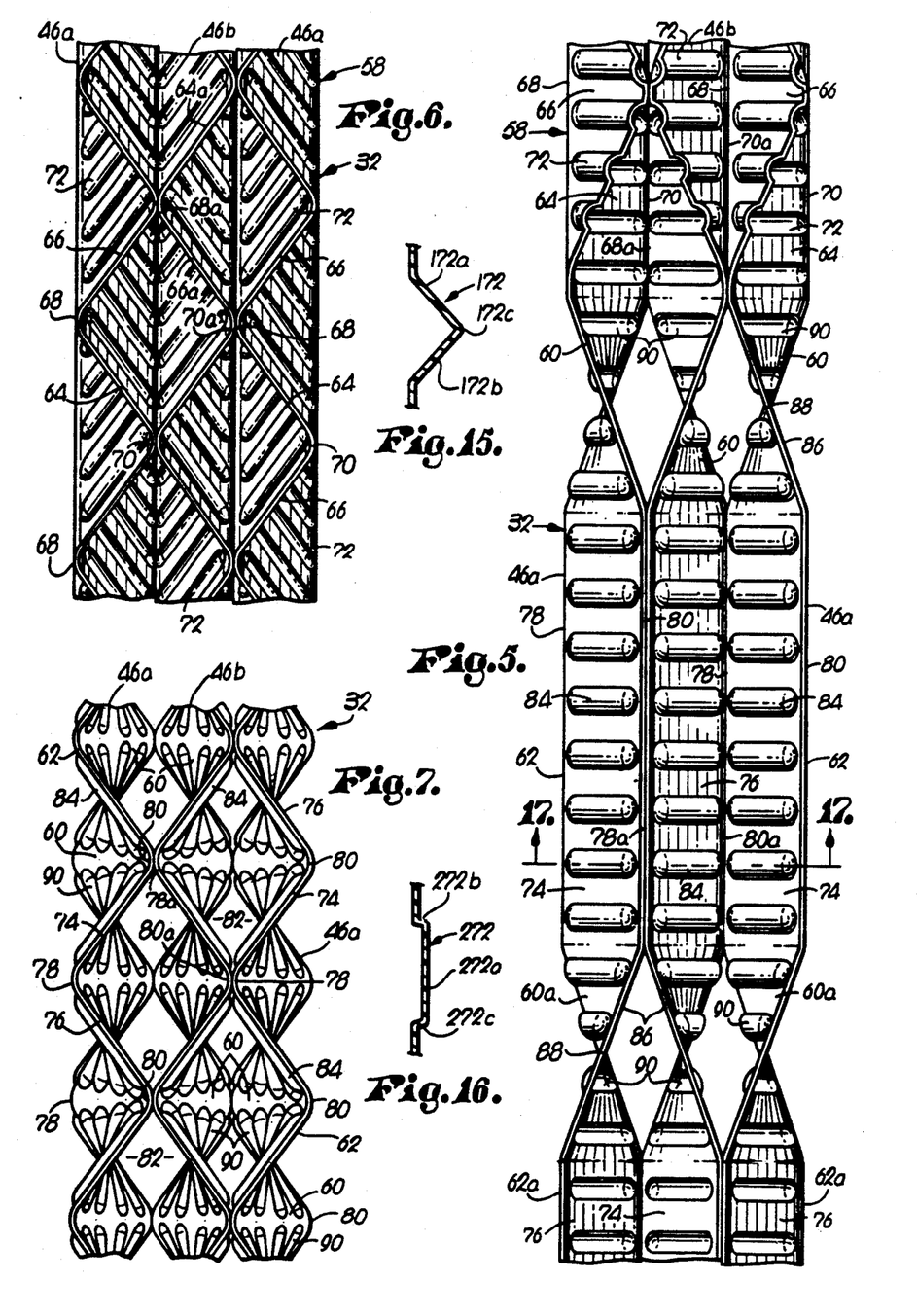
FIG. 5 is a fragmentary, side elevational view of the improved fill pack of this invention.
FIG. 6 is a fragmentary, top plan view of the fill pack.
FIG. 7 is a fragmentary, bottom plan view thereof.
FIG. 15 is an enlarged fragmentary cross-sectional view illustrating one of a series of modified surface area increasing projection structures which may be formed in the wall structure of each fill sheet in transversely extending relationship to the passage segments and the transition zones respectively.
FIG. 16 is an enlarged fragmentary cross-sectional view of another form of the surface area increasing projection structure which may be provided across the passage segments and the transition zones.

As is best shown in FIGS. 3, 4 and 5, the first horizontally extending undulating region 62 below hot water redistribution section 58 and separated from the latter by the uppermost transition zone 60a, also is made up of a series of angular side walls 74 and 76 which converge to form an elongated, rectilinear peak 78 therebetween. The transverse width of angular side walls 74 and 76 is preferably about 1.35 inches. The portions of adjacent side walls 74 and 76 which recede from respective peaks 78 define elongated, rectilinear valleys 80. All of the regions 62 and 62a-62i inclusive are also all of the same wall configuration and therefore same reference numerals have been applied to similar walls structure portions.

Thus, as is apparent from FIG. 4, adjacent sheets 46a and 46b, are configured such that all of the peaks 78 of sheet 46a are in directly opposed relationship to the valleys 80a of sheet 46b. Likewise, the valleys 80 of sheet 46a are in direct opposition to the peaks 78b of the sheet 46b. As a consequence, adjacent peaks and valleys and spaced peaks and valley of sheets 46a and 46b cooperate to define elongated vertical passage segments 82 extending throughout the length of angular side walls 74 and 76 of the regions 62. The relationship of the crests and valleys of each horizontal region 62 with respect to the crests and valleys of a region thereabove and therebelow is offset horizontally by one half cycle, with a full cycle being defined as the horizontal distance from crest to crest or valley to valley in each region.

Side walls 74 and 76 of all of the regions 62 of each of the sheets 46 are also provided with projections 84 which are similar in shape and size to the projections 72. Again, in view of the fact that the sheets 46 are vacuum formed, each projection 84 has a corresponding recess on the opposite side of the sheet. The dimensions previously set forth with respect to projections-depressions 72 apply to projections-depressions 84, except that the latter are about 1.2 inches in length. The distance center-to-center between adjacent projections-depressions 84 is from about ½ to 1 inch, with ½ inch spacing being preferred. Although the projections-recesses are depicted as being vertically aligned, that alignment is not essential to thermal performance and the projections-recesses can be vertically offset if desired.

The included angle between angular side walls 74 and 76 is optimally about 105°. In view of the fact that the peaks and valleys of region 62 should mate with the crests and valley depressions of the corrugated section 58, the relative angularity of side walls 74 and 76 is a function of the angularity of the side walls 64 and 66. Thus, as can be seen from FIG. 4, the valleys 80 of region 62a should vertically align with the crests 68 of the overlying section 58.

The shape and orientation of the wall surfaces of the transition zones 60 is perhaps best understood from FIGS. 8-14 inclusive. However, for clarity, projection-recesses 90, which are similar to projection-recesses 72 and 84 have omitted, although it is to be understood that such projection-recesses are normally present as is evident from FIGS. 4 and 5.

Figures 8, 9, 10, 11, 14:
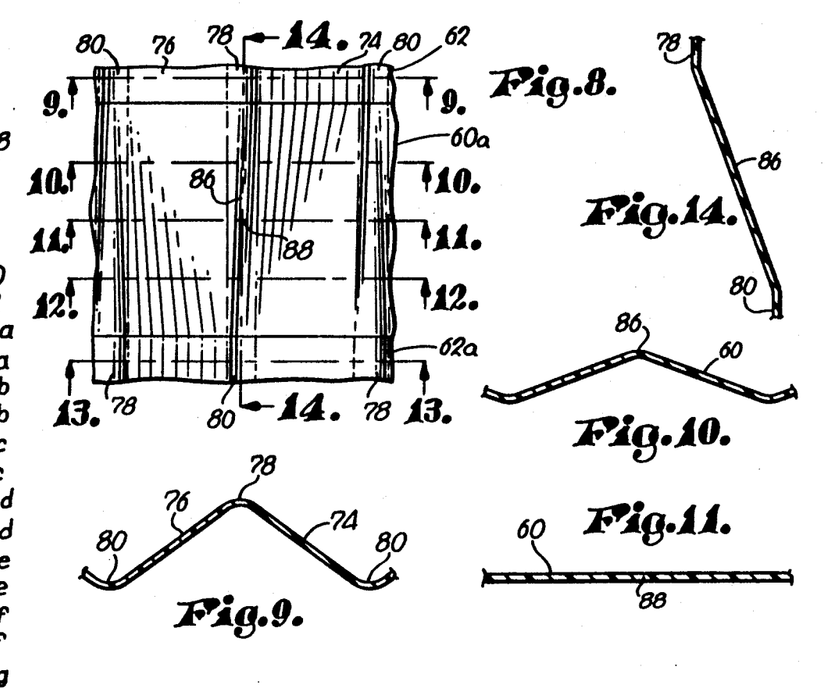
FIG. 8 is a fragmentary, elevational view of a transition zone between vertically spaced passage segment-defining regions of a fill sheet and illustrating the transition between an overlying passage segment and vertically offset underlying passage segments, with the area increasing projections and depressions forming a part of the sheet being omitted for clarity.
FIGS. 9-14, are fragmentary, cross-sectional views taken on the lines 9—9, 10—10, 11—11, 12—12, 13—13, and 14—14, respectively, of FIG. 8.

Referring initially to FIG. 8 which fragmentarily depicts a portion of the transition zone 60a, it can be seen that the transition between the overlying region 62 and the underlying passage segment defining region 62a is somewhat hyperbolic in shape and includes surfaces which merge smoothly from a valley of the undulating section 62 to the valleys of undulating region 62a immediately therebelow. The sectional views 9-14 taken through the designated sectional lines of FIG. 8 show that from a crest 78 of a pair of adjacent valleys 80 therebelow, the sector of the sheet transitions smoothly and evenly from a depression over a hump and back to a depression or valley.

Figure 12:
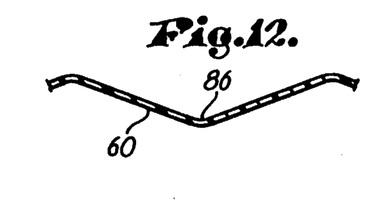
Figure 13:
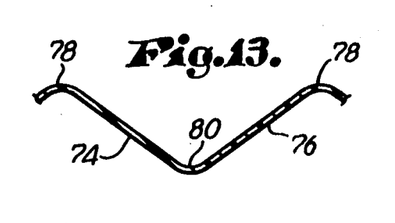

FIG. 9, for example, illustrates the crest 78 defined by side walls 74 and 76 and which is located at the upper part of the transition wall sector depicted in FIG. 8. Similarly, FIG. 13 depicts the valley 80 presented by angular side walls 74 and 76 of the region 60 therebelow. The transition line 86 as shown in FIG. 14 between the lower end of crest 78 of FIG. 8 and the upper end of valley 80 in such figure is straight. In like manner, the transition 88 line normal to transition line 86 is similarly straight. As a consequence, the transition lines depicted by FIGS. 10 and 12 are intermediate between the extreme peaks and valleys of FIGS. 9 and 13, and the straight line transitions of FIGS. 11 and 14.

Accordingly, the transition from each valley depression 70 of redistribution section 58 and the valleys 80 of regions 62 and 62a-62h divert water therefrom into valleys 80 on horizontally opposite sides of an underlying, vertically aligned peak 78. Notwithstanding the rectilinear nature of straight line transitions 86 and 88, the transitions from a valley depression 70 of corrugated section 58 or valleys 80 toward underlying vertically offset valleys 80 are cross-sectionally curvilinear.

Although not illustrated for clarity in FIGS. 8-14 as previously indicated, the transition zones 62a-60i are also provided with a series of projections-recesses 84 which are the same dimensions as the projections-recesses 84 previously described. It is evident from FIG. 4 that the length of each of the projections-recesses 84 is dictated by the available width of a respective transition sector.

In a preferred embodiment, each region 62 is about 4 inches in vertical height and each transition zone 60 is about 2 inches in vertical height. Thus, the passage segments defined by a respective region 62, and one-half of a transition zone thereabove and therebelow have a vertical extent of about 6 inches. The overall vertical extent of a respective transition area should be from about 1 inch to 2 inches. In like manner, each of the passage segments not including end transition zones should be in the range of about 3 to 5 inches. If an upright passage segment without considering the transition zones has a length significantly greater than about 6 inches, the thermal performance of the film pack begins to decrease. Furthermore, length of a fully formed tube section made up of a respective transversely polygonal vertical passage segment and one-half of the transition zone above such segment as well as one-half of the passage segment therebelow, should be from about 1.3 to about 9 times the center line to center line sheet spacing of adjacent film fill sheets 46. A preferred ratio in this respect is about 5 to 6, with the preferred ratio being a fully formed tube length as previously defined of about 5 and ⅓ times the effective center line to center line sheet spacing.

These overall vertical dimensions of the film pack may be varied with the greatest optional variation being in the vertical extent of the regions 62 by virtue of the fact that the vertical height of the transition zones 60 is dictated in large measure by the smooth transition required from one region to the next. However, in a typical fill pack which is 4 feet wide and 6 feet in height, using the scale of FIG. 3 which is 3×4 inches, it can be seen that there will be 10 regions 62 and 10 associated transition zones 60, assuming that the redistribution area 58 is 12 inches high.

From the foregoing, it can also be seen that the undulating regions 62 of adjacent sheets cooperate to define upright, transversely polygonal vertical passage segments 82 which extend the full height of each region 62. Furthermore, the segments define an elongated passage extending from redistribution 58 to the lower extremity of a fill pack which is non-linear along its length. A passage therefore can be said to be made up of a series of vertical passage segments which are horizontally offset so that hot water descending through the fill pack must follow a serpentine path. This is important to avoid excessive velocity of hot water as it flows downwardly through respective non-linear passages. However, notwithstanding the non-linear nature of the vertical water and air interchange passages, the cross-sectional area of such passages is relatively uniform throughout the length thereof (except for projections-recesses 90 which do not significantly decrease the cross-sectional area of the passage), thus offering a flow path for the water which is devoid of areas or restrictions which would tend to be clogged by foreign objects in the water, or would offer a habitat for growth of microorganisms such as algae in the hot water. The transition zones 60 are configured to retain the open characteristics of the water flow path defined by the non-linear passages.

Projections-recesses 84 serve an important function of preventing channelling of hot water as it flows downwardly through the non-linear passages as defined by vertical passage segments 82 and to also impart a certain degree of turbulence to the upflowing air which is moving in counter-current relationship to the hot water. The same is true with respect to the angular passages defined by corrugated region 58. With respect to the non-channelling characteristics of the projections-recesses, the size and disposition thereof causes water to be redistributed laterally as it encounters each projection or recess, and furthermore, requires that the water move outwardly from the face of an angular wall surface which spreads the water out to enhance retention of the film nature thereof. The same is true of the transition zones 60 where the projections-recesses again resist channeling of the water and continues stirring of the air as it moves upwardly in the passages. Therefore, air which has not seen hot water is constantly being exposed to new water, which again has not seen coolant air.

Alternate embodiments of the projections 72 and 84 are depicted in FIGS. 15 and 16. The projection 172 of FIG. 1, is triangular in cross-section and therefore has two converging leg segments 172a and 172b which culminate in a peak 172c. In the embodiment of FIG. 16, the projection 272 is plateau-shaped and has a relatively flat outermost surface 272a joined at opposite side margins thereof to relatively short wall sections 272b and 272c. The height of the plateau-shaped 272 is nominally 0.01 inch. It is to be understood in this respect that the crown defined by plateau surface 272a may be slightly curved if desired.

In operation, hot water which has not been significantly treated to retard algae growth or proliferation of other microorganisms therein is directed to the hot water distribution means 26 for delivery onto the top of the fill packs 30-44. The cross-corrugated section 58 redistributes water impinging on the upper face thereof so that the hot water is relatively uniformly distributed into the upwardly facing openings presented by adjacent sheets 46. The hot water immediately tends to form a film on the surfaces of the side walls 64 and 66 of respective sheets 46 and to gravitate downwardly in an angular direction along the length of each. When water flowing downwardly along an angular surface encounters a point of intersection between crests and valley depressions of the cross-corrugated section 58, some of the water may be diverted onto another angular surface so it moves in a different direction than originally the case. This results in redistribution of the water as it gravitates downwardly in the section 58 so that there is no tendency for the water to move toward a specific part of the fill assembly pack. As previously indicated, the projections-recesses 72 also function to retain the film characteristics of the water and to prevent channelling along the surface of respective angular walls. The projections-recesses 72 also tend to prevent stratified flow of air through the redistribution section 58.

When the gravitating hot water encounters the uppermost transition zone 60, the water in each valley-depression 70 is divided and diverted into respective pairs of underlying vertical passage segments 82. Water flowing over the transition sector retains its film properties and flows smoothly and uniformly into the underlying passage. Here again the projections-recesses 90 prevent channeling of the water as it is diverted into underlying passages. During gravitational flow of the water downwardly through the non-linear passages defined by segments 82 and intermediate transition zones 60, the horizontally offset vertical segments 82 impede flow of the hot water to an extent necessary for maximum thermal interchange between the water and the coolant air.

The only connections between adjacent fill sheets in regions 62 is along the length of engaging peaks and valleys 78 and 80. These are vertical points of joinder and thus there are no crooks, crannies, or other recesses in which microorganisms can lodge for growth thereof in a manner which would ultimately result in blocking of the upright passages. Although not depicted in the drawings, it is to be understood that interlocking means may be provided for joining the sheet sections together along the areas of engagement between the peaks 78 and valleys 80 of adjacent sheets.

The transition zones 60 while minimizing changes in the cross-sectional area of the upright passages throughout the length thereof, also prevent excessive pressure drop in the upflowing air notwithstanding the fact that the upright water and airflow passages have horizontally offset segments requiring serpentine water and air flow. Undue loss of water in the airstream is also prevented because the water tends to remain as a film on the fill sheets and is not broken up into droplets which would be entrained in the humid air.

One feature of the present invention is the fact that the sheets 46 may be formed in a single mold if desired and then oriented in opposite facing relationship to make up a fill pack 30-44.

It is also to be noted that the crests 78 of regions 62 of sheets 46 which contact one another, do so throughout the length of respective vertical passage segments 82. However, the interengaging surface need not be adhesively joined throughout the entire length of interengagement, or even along each such length at all, provided there is no significant leakage of air and/or water through the joint between the interengaging crest surfaces.

ALTERNATE EMBODIMENT OF THE INVENTION

Figures 17, 18, 19:
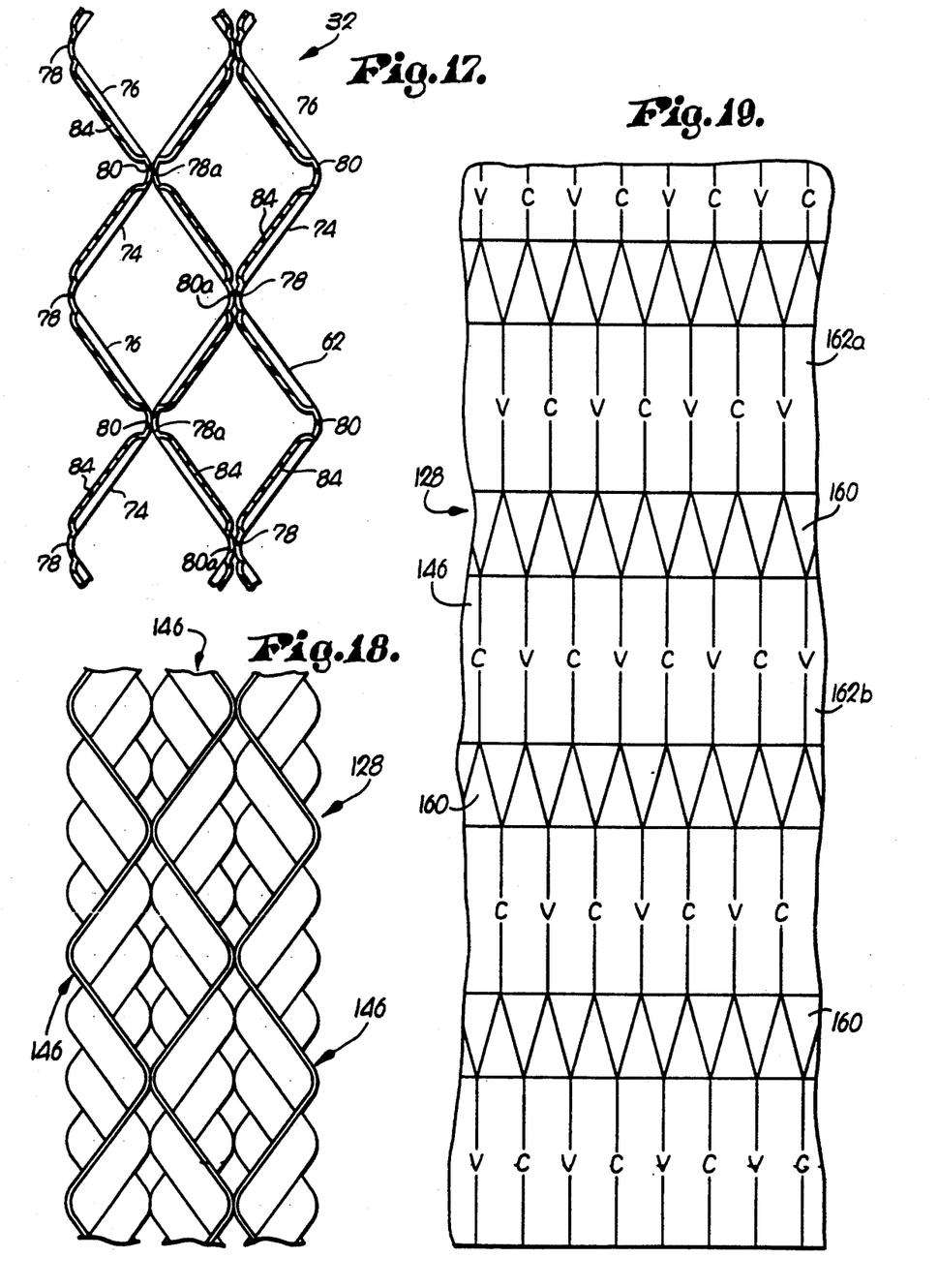
FIG. 17 is a fragmentary cross-sectional view along the line 17—17 of FIG. 5 and looking in the direction of the arrows.
FIG. 18 is a bottom view of an alternate embodiment of the a fill pack incorporating the invention hereof with the individual passage segments of adjacent fill pack sheets being offset from one another approximately half of the offset relationship of the passage segments depicted in FIGS. 4, 6 and 7.
FIG. 19 is a fragmentary upright essentially diagrammatic representation of a fill pack sheet constructed in accordance with the alternate embodiment of the fill shown in FIG. 18, with the crest and valleys of the respective raised and depressed areas being indicated by the letters "C" and "V" respectively.
Figure 20:
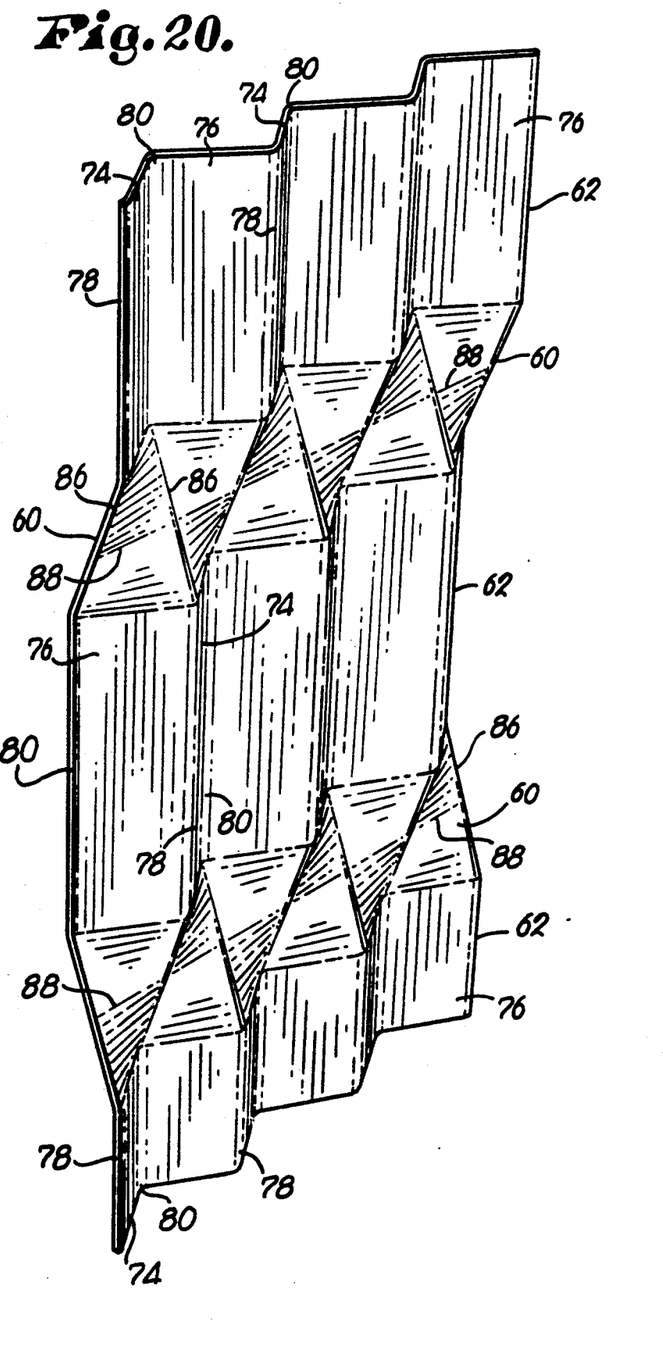
FIG. 20 is a view of the transition zone of one of the sheets.

In the fill pack structure 128 illustrated in FIGS. 18 and 19, the sheets 146 are similar to sheets 46 but differ from the latter in that the passage segments defined be the regions 62 of adjacent sheets 146 are offset only about one quarter cycle rather than one half cycle as is the case with fill structure 28. Thus, viewing FIG. 19 it can be seen that the formed fill sheet 146 illustrated has a series of horizontally extending, undulating, horizontally spaced passage, vertical segment defining regions 162. Immediately above each of the regions 162 is a transition zone 160, while a second transition zone 160 is below each region 162, except for the lowermost undulating region.

As schematically depicted in FIG. 19, the alternating valleys and crests of the undulations are indicated by the designations "V" and "C" respectively. In the region 162b below the uppermost region 162a, it is to be seen that the valleys "V" for example are located midway between the valley and crest of a segment 162a. This horizontal offset therefore amounts to about 45°. The operation of the fill pack 128 is essentially the same as previously described with respect to the operation of the fill pack 128.

We claim:

1. In a counterflow water cooling tower having hot water distribution means and structure for causing cooling air to flow in countercurrent relationship to hot water gravitating downwardly from the distribution means, a fill pack assembly comprising:

a series of generally parallel film fill sheet sections in side-by-side relationship, said pack being adapted to be located in vertically disposition for receipt of hot water at the top thereof from the hot water distribution means and to receive upflowing cooling air at the lower part thereof, each of said fill sheet sections having at least two separate wall regions with one being above the other, each of the regions of said sheet sections being generally horizontally aligned with a corresponding wall region of the next adjacent fill sheet section, each of said wall regions having portions which define a horizontally extending undulating pattern with successive portions extending toward and away from an adjacent fill sheet section, said portions of each wall region cooperating with the portions of an adjacent fill sheet to define a series of elongated, side-by-side vertical passage segments for receipt of hot water which flows downwardly therethrough in essentially film form over the surface of each such passage segment and for receipt of cooling air which flows upwardly through a corresponding passage segment in generally countercurrent heat exchange relationship with hot water, each of the passages defined by portions of adjacent, horizontally aligned regions of the fill sheets presenting an open area extending from the top of the passage to the lower extremity of the same, said passages being of transverse dimensions throughout the length thereof to impede clogging of the passages by extraneous objects in the water or microorganism growths on the wall regions defining such passages, the portions of the wall structures being configured such that the passage segments defined by the wall regions of adjacent pairs of fill sheets are horizontally offset from the passage segments defined by the next vertically adjacent regions of the same pair of fill sheets so that each passage is non-linear along its length with the cross-sectional area thereof being sufficiently open along the length thereof to maintain the essentially anti-clogging characteristics thereof, the passage segments defined by the wall structures of adjacent sheet sections being offset horizontally from the passage segments defined by sheet sections on opposite sides of each adjacent pair of sheet sections, said wall structure of each fill sheet being provided with transition zones between adjacent regions which are configured to interconnect the horizontally offset passage segments of adjacent wall regions, each of said transition zones including a wall sector which merges smoothly from the lower end of one passage segment into the entrance end of an adjacent horizontally offset passage segment therebelow.

2. In a counterflow water cooling tower having hot water distribution means and structure for causing cooling air to flow in countercurrent relationship to hot water gravitating downwardly from the distribution means, a fill pack assembly comprising:

a series of generally parallel film fill sheets in side-by-side relationship, said pack being adapted to be located with the individual sheets thereof in vertical disposition for receipt of hot water from the hot water distribution means at the top of the pack and to receive upflowing cooling air at the lower part of the pack, each of said fill sheets having wall structure configured such that adjacent sheets define therebetween a series of elongated, side-by-side, vertical longitudinally non-linear passages for receipt of hot water which flows downwardly therethrough in essentially film form over the surface of each such passage and for receipt of cooling air which flows upwardly through a corresponding passage in generally countercurrent heat exchange relationship with hot water, each of the passages presenting an open area extending from the top of a respective passage to the lower extremity of the same, said passages being of transverse dimensions throughout the length thereof to impede clogging of corresponding passages by extraneous objects in the water or microorganism growths on the wall structure defining such passages, the wall structure of each fill sheet being configured to present at least an upper and a lower vertically spaced, horizontally extending undulating region defined by alternating crest portions and valley portions on opposite sides of the sheet with each crest portion on one side of the sheet presenting a valley portion on the opposite face thereof, each of the crest portions of the upper region of each sheet being offset horizontally from adjacent crest portions of the lower region immediately therebelow, adjacent sheets of the pack being oriented such that the crest portion of each region of each sheet is generally aligned with and engaging the crest portion of the next adjacent sheet throughout the length of the crest portions whereby directly opposed valley portions of each region cooperate to define vertical oriented, elongated segments of a respective passage therebetween, the passage segments defined by opposed, adjacent upper regions of proximal sheets being horizontally offset from the passage segments defined by opposed, adjacent lower regions immediately therebelow, said wall structure of each sheet having water conveying transition wall means which extends from the valley portions of the upper region of a respective sheet to the valley portions of the lower region immediately therebelow to provide a relatively smooth transition from the lower end of each of the passage segments defined by adjacent upper regions of the sheets into the passage segments presented by adjacent lower regions of the sheets, said passage segments and a part of an overlying zone and an underlying zone cooperatively defining fully formed tube sections, the spacing between proximal valley portions defining said passage segments and adjacent transition zone surfaces being adequate to cause the cross-sectional area of said fully formed tube sections to be sufficiently open throughout the length thereof to maintain the essentially anti-clogging characteristics of said passages, and the passage segments defined by the upper regions and lower regions respectively of adjacent sheets, being horizontally offset from the passage segments defined by the upper regions and lower regions respectively of next adjacent sheets.

3. A fill pack assembly as set forth in claim 2, wherein the wall structure defining the upper and lower undulating regions being provided with surface area increasing means which limits channeling of the hot water as it flows downwardly through a respective non-linear passage and which imparts turbulent flow characteristics to at least a part of the cooling air flowing upwardly through a corresponding passage, without interfering with the anti-clogging characteristics of such passages.

4. A fill pack assembly as set forth in claim 2, wherein is provided hot water redistribution means in overlying relationship to the series of film fill sheet sections for redistributing hot water received from the distribution means over the series of film fill sheet sections.

5. A fill pack assembly as set forth in claim 2, wherein said transition wall means is transversely curvilinear.

6. A fill pack assembly as set forth in claim 2, wherein the greatest center-to-center horizontal spacing between adjacent wall structures of the fill sheets is from about ½ inch to about 1 inch.

7. A fill pack assembly as set forth in claim 2, wherein the greatest center-to-center horizontal spacing between adjacent wall structures of the fill sheets is from about ⅝ inch to about ⅞ inch.

8. A fill pack assembly as set forth in claim 2, wherein the greatest center-to-center horizontal spacing between adjacent wall structures of the fill sheets is ¾ inch.

9. A fill pack assembly as set forth in claim 2, wherein said sheets are each provided with a series of vertically spaced, alternating regions and transition zones.

10. A fill pack assembly as set forth in claim 2, wherein said wall structure of each sheet is configured to define a third undulating region below said lower region and having alternating crest portions and valley portions on opposite sides of the sheet, respective crest and valley portions of said third region being generally vertically aligned with corresponding crest portions and valley portions of said upper region of the sheet whereby said non-linear passages are each of generally serpentine configuration longitudinally thereof.

11. A fill pack assembly as set forth in claim 2, wherein the crest portions of said lower region are horizontally offset from corresponding crest portions of the upper region thereabove by a distance approximately one-half of the width of a wall surface defined by the extremities of adjacent valley portions and crest portions.

12. A fill pack assembly as set forth in claim 2, wherein said wall structure of each sheet section is configured to cooperate with adjacent fill sections to define a series of passages which are polygonal in transverse cross-section.

13. A fill pack assembly as set forth in claim 12, wherein said passages define a parallelogram transversely thereof.

14. A fill pack assembly as set forth in claim 2, wherein said tube sections are each of a length that is within the range of about 1.3 to 9 times the center-to-center spacing of adjacent sheets.

15. A fill pack assembly as set forth in claim 14, wherein said length of each of the tube sections is about 5 times the center-to-center spacing of adjacent sheets.

16. A fill pack assembly as set forth in claim 2, wherein said hot water distribution means comprises a series of generally parallel upright corrugated panels with adjacent panels being arranged in relationship such that the corrugations thereof are in crossing relationship.

17. A fill pack assembly as set forth in claim 16, wherein the openings presented by the lower ends of each of the corrugations of respective panels are oriented to deliver hot water into the upper ends of a pair of passages.

18. A fill pack assembly as set forth in claim 17, wherein each of said panels is formed integrally with a respective fill sheet section.

19. A fill pack assembly as set forth in claim 16, wherein the panels are each provided with surface area increasing means in the corrugations thereof which limit channeling of the hot water as it flows downwardly in film form through a respective corrugation and which imparts turbulent flow characteristics to at least a part of the cooling air flowing upwardly through corresponding corrugations.

20. A fill pack assembly as set forth in claim 19, wherein said surface area increasing means comprises a series of elongated, vertically spaced projections from the wall surface defining each of the passages.

21. A fill pack assembly as set forth in claim 19, wherein said surface are increasing means comprises a series of elongated, vertically spaced depressions in the wall surface defining each of the passages.

22. A fill pack assembly as set forth in either claims 20 or 21, wherein the projections or depressions are of significantly greater length horizontally than the vertical dimension thereof, with each being of relatively uniform configuration longitudinally thereof.

* * * * *